April 9, 1963 R. R. BOWER 3,084,811
ARTICLE HANDLING
Filed Dec. 27, 1960 7 Sheets-Sheet 3
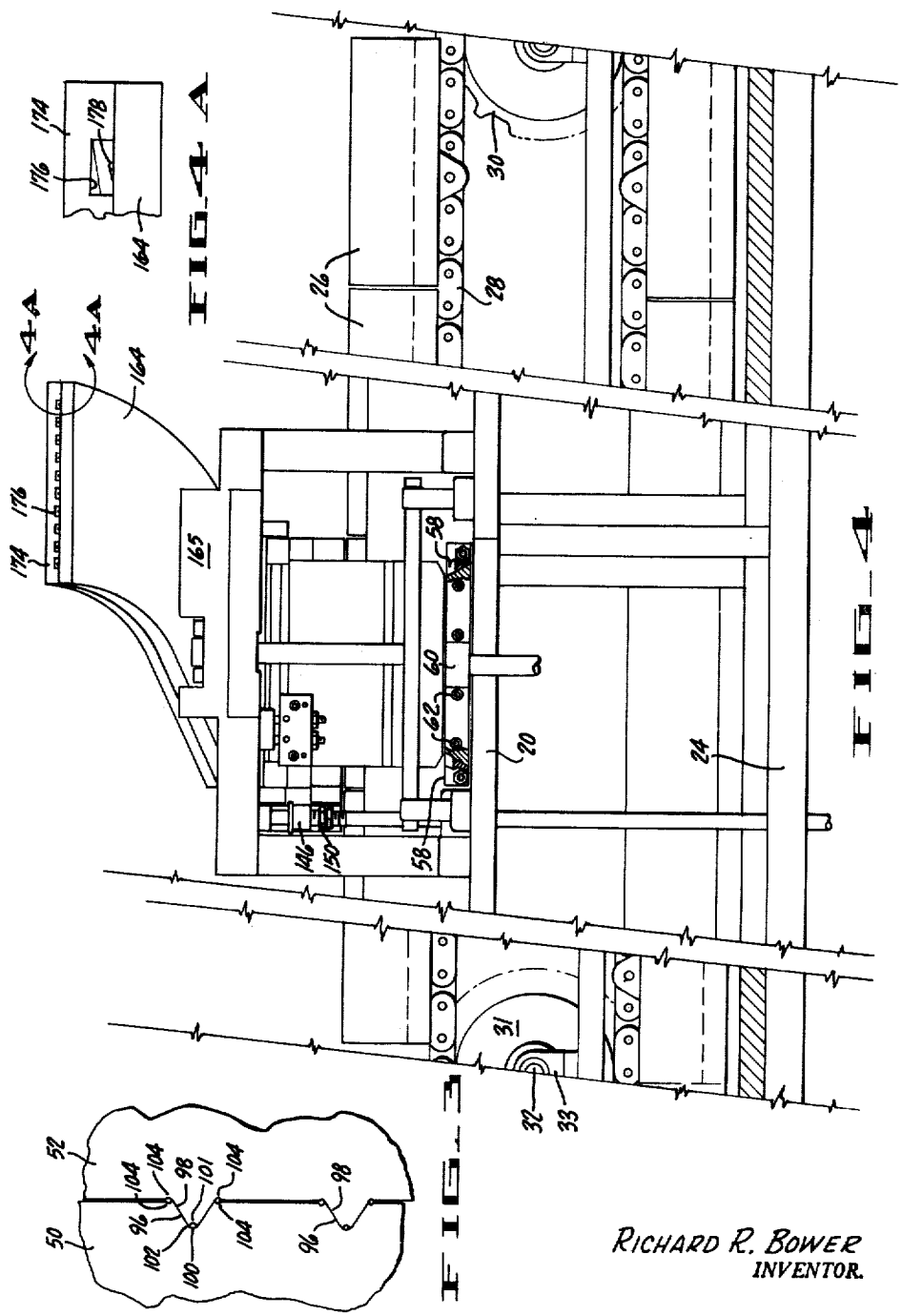
RICHARD R. BOWER
INVENTOR.
BY
Christie Parker & Hale
ATTORNEYS

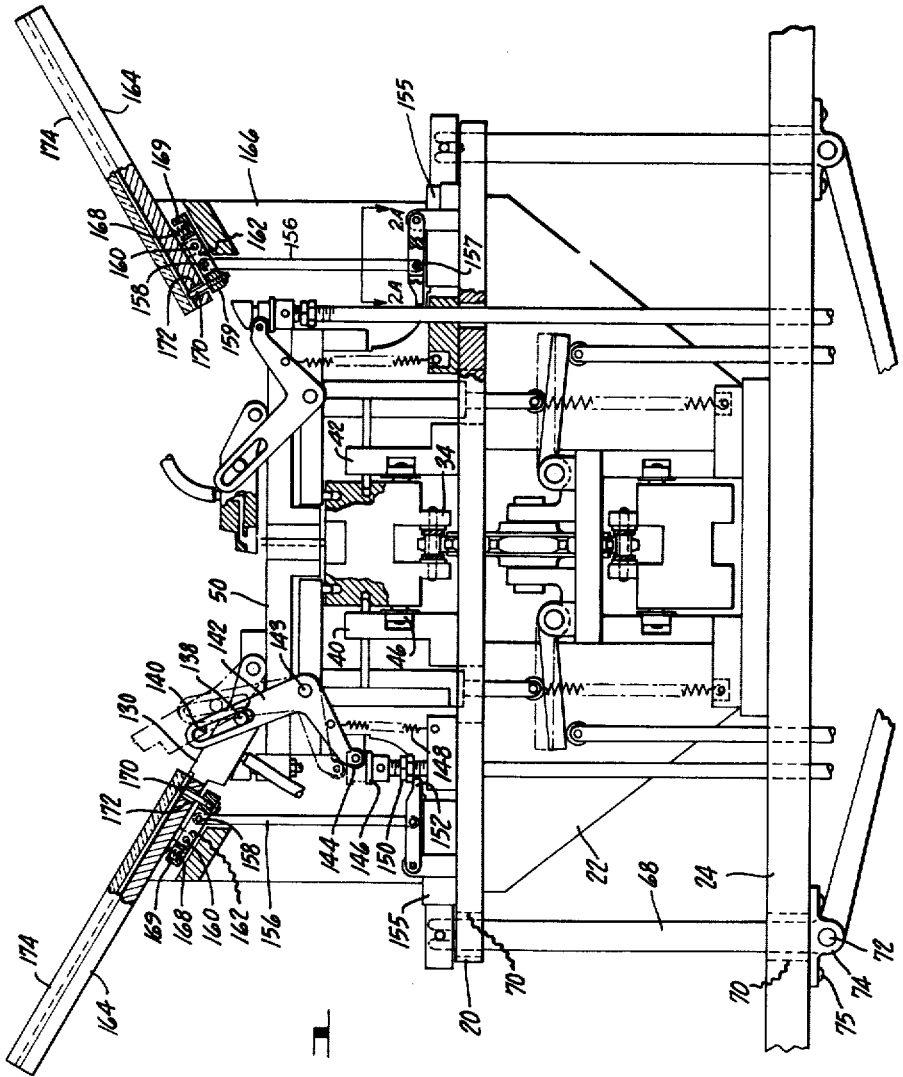

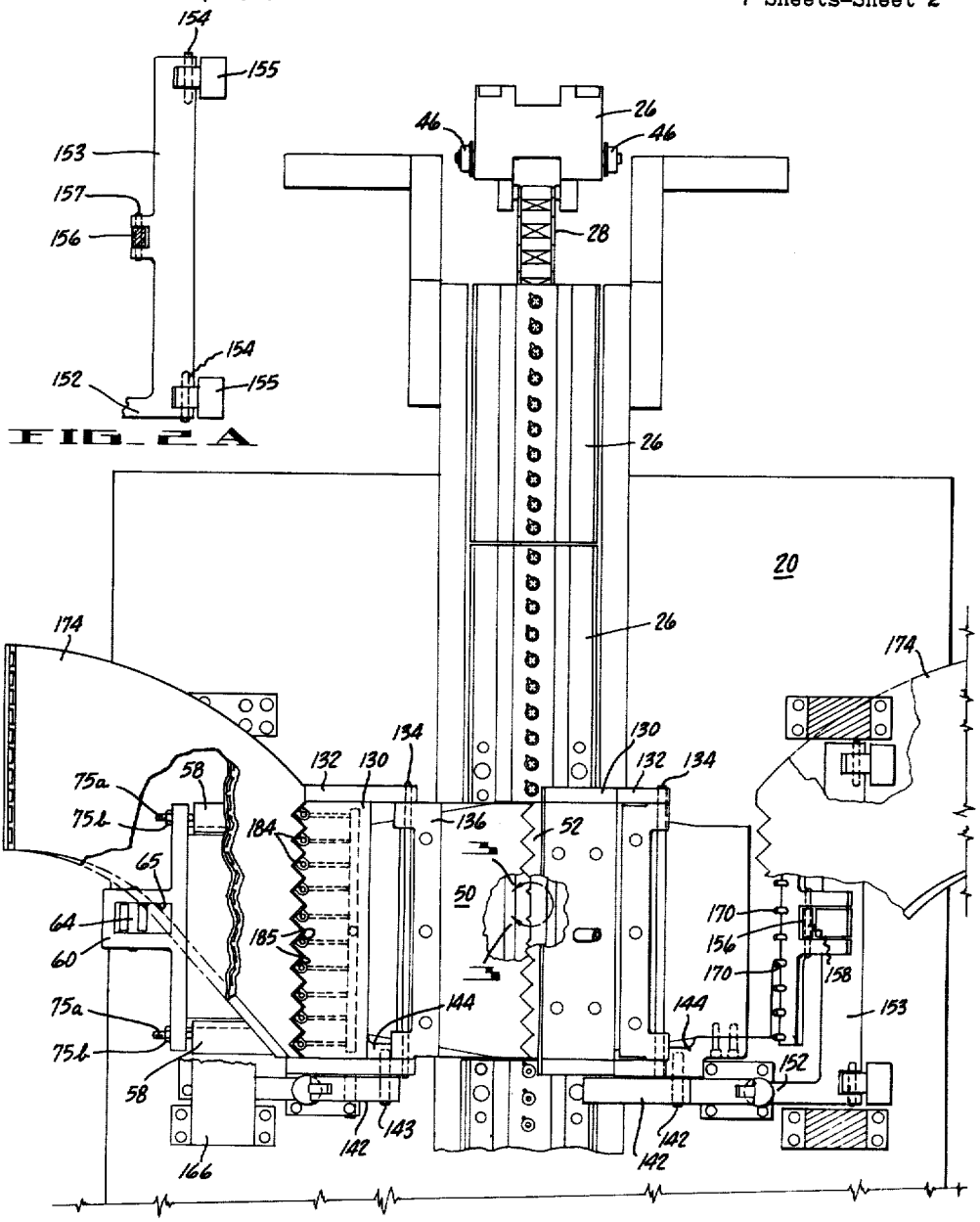

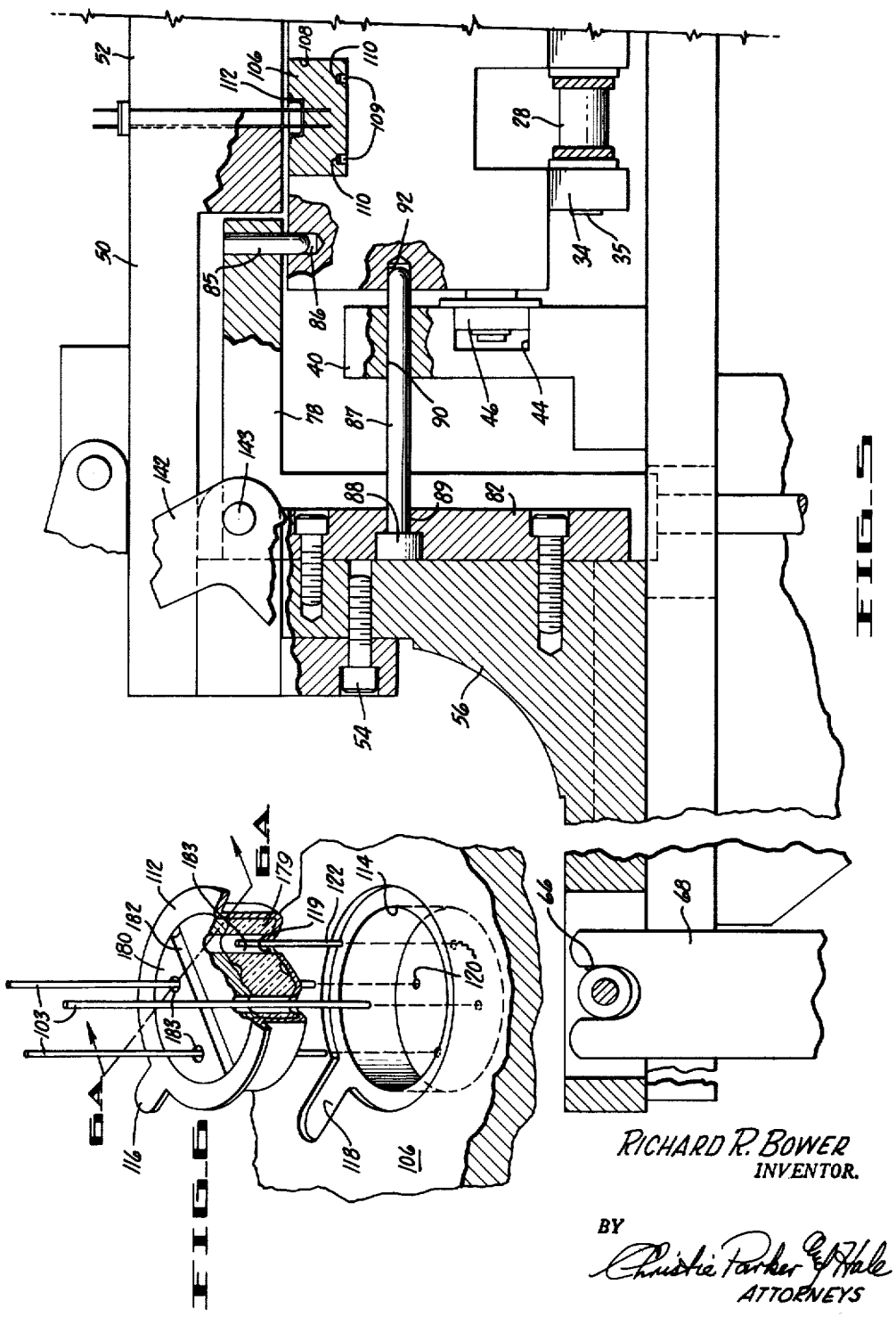

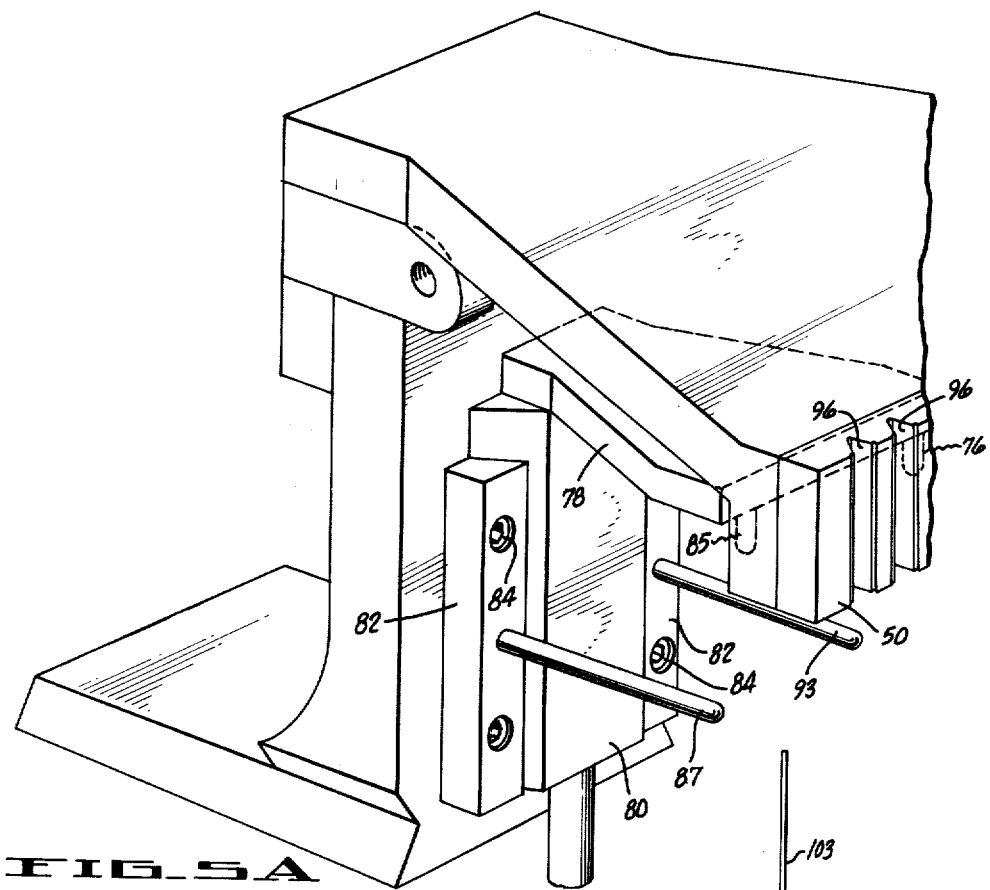
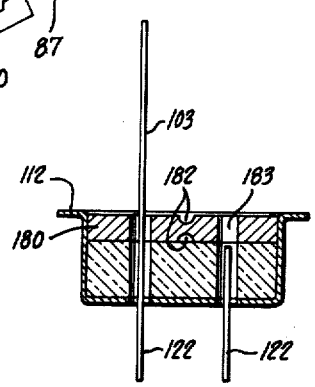
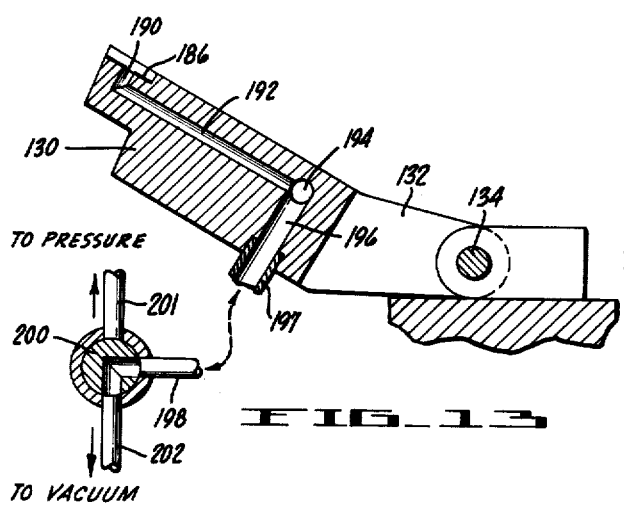

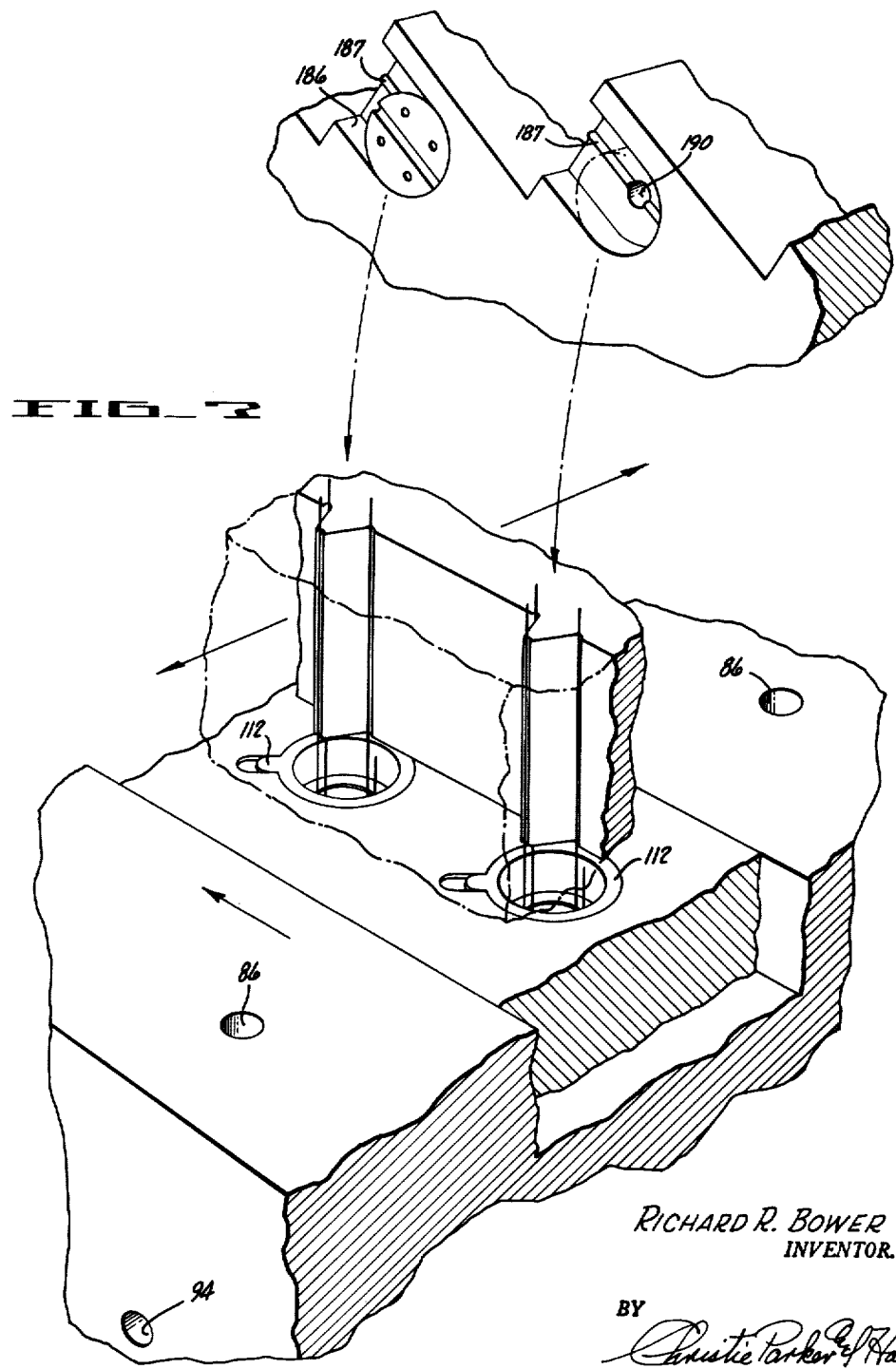

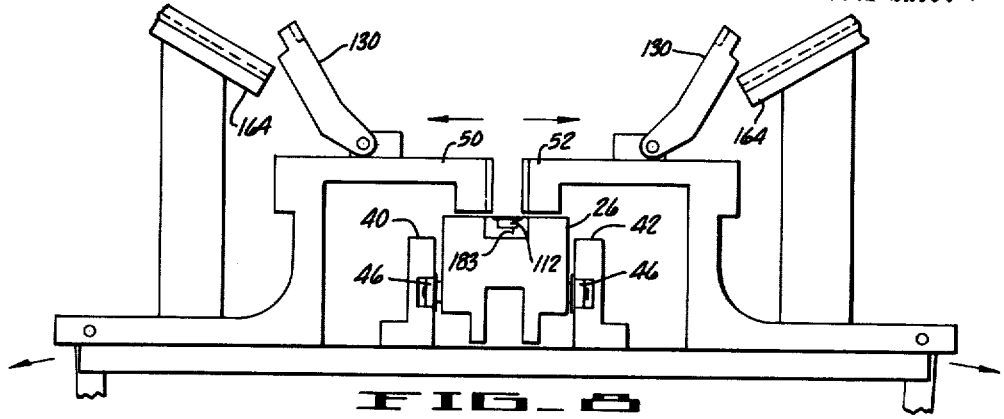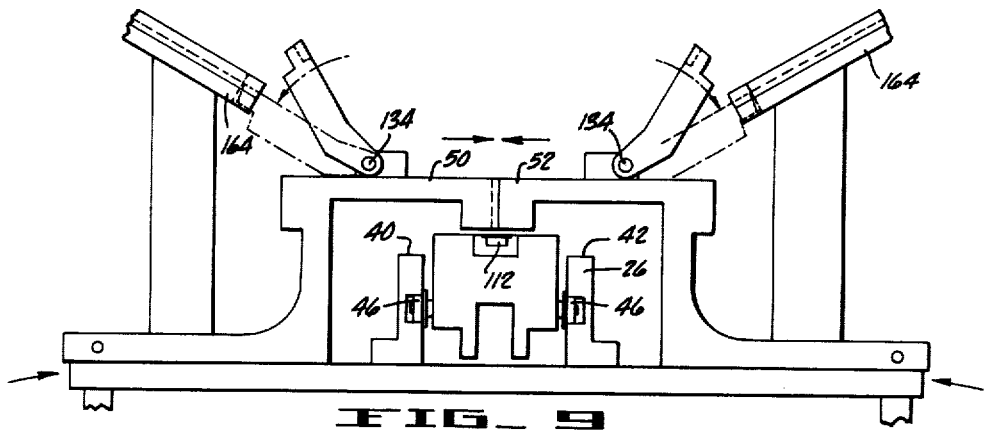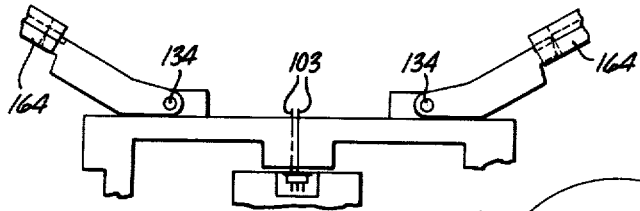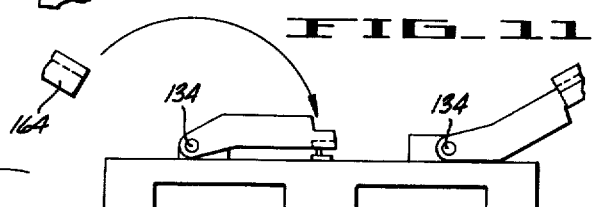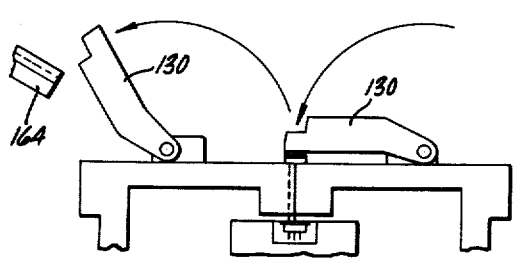

United States Patent Office 3,084,811
Patented Apr. 9, 1963

3,084,811
ARTICLE HANDLING
Richard R. Bower, Los Altos Hills, Calif., assignor, by mesne assignments, to Raytheon Company, Lexington, Mass., a corporation of Delaware
Filed Dec. 27, 1960, Ser. No. 78,580
4 Claims. (Cl. 214—1)

This invention relates to machines for handling individual articles.

In many industries it is necessary to handle or process a large number of individual articles on a mass production basis. Doing such a job by hand is expensive, and often subject to human error, particularly when the articles to be handled must be selected at random from a large group of loosely stored items, and thereafter be subjected to a precision assembly operation and processing.

For example, in the assembly of semiconductor components such as transistors, it is common practice to seal a plurality of elongated wire leads in a header, which is a metal cup-shaped container having holes in its bottom. At the present time, the wire leads are manually located in the holes in the header and in holes in a glass disk which is disposed in the header. Thereafter, the header wires and glass disk are heated so that the glass is melted to fuse and bond the wires to the header.

The components assembled in this fashion are small and delicate, and the work is necessarily tedious and time-consuming when done by hand.

This invention provides apparatus for automatically forming guideways through which the wire leads can be moved into the proper locations in the header, and held in that position to permit the glass disk to be fitted on the wires and moved into the proper position in the header. Moreover, the apparatus of this invention permits a plurality of the wires to be oriented with respect to any number of headers simultaneously, and also provides for simultaneous placement of the glass disks on the wire leads.

Thus, the apparatus of this invention can simultaneously assemble any number of glass disks in respective headers and thus do work which was previously done manually by a number of individual operators.

Briefly, this invention contemplates article handling apparatus which includes a carriage on which articles are to be mounted. A pair of movable jaws are mounted adjacent the carriage, and means are provided for moving the jaws toward and away from each other. Adjacent portions of the jaws are shaped to form at least one guideway extending toward the carriage when the jaws are moved together. Means are provided for disposing articles on the jaws in the vicinity of the guideway so that when the jaws are opened, the articles are free to move toward the carriage.

In the preferred form of the invention, elongated members, such as wire leads, are disposed in the guideways to extend through the jaws and toward the carriage. Thereafter, articles, such as glass disks with holes extending through them to match the wire leads are slipped over the wire leads so that when the jaws are opened the glass disks are free to move toward the carriage and be guided by the wire leads.

Preferably, the jaws include indexing means which are movable toward the carriage after the jaws are moved together. The carriage includes means to receive the indexing means on the jaws and lock the carriage in a fixed position with respect to the jaws.

In the preferred form of the invention, articles are moved to the jaws by picking the articles up from a supply station, turning them over, and placing them on the jaws in the vicinity of the guideway.

Preferably, the articles to be placed on the jaws are allowed to slide onto a transfer plate and are held by vacuum as the plate is turned over and disposed above the guideway in the jaw. Thereafter, the vacuum is released, and positive pressure is applied so that the articles are dropped from the transfer plate onto the jaws in the vicinity of the guideway.

When an elongated member is in the guideway, and the article has an opening through it, the article is disposed so that it slips down over the member in the guideway and comes to rest on the jaws. Thereafter, when the jaws are opened, the article slides down the elongated member into its proper position on the carriage.

Preferably, the jaws can be opened sufficiently wide to provide clearance for the carriage to be moved in a direction transverse to the elongated member and carried free of the jaws.

In the preferred form of the invention, when the article being loaded on the carriage is a glass disk to be fused with wire leads and a metal header, a suitable weighting disk is placed on top of the glass disk by article moving means substantially identical with that used to locate the glass disk in the proper position. Thus, when the jaws are open, the glass disk slides down into the header, and the weighting disk, say a graphite disk, slides down on the top of the glass disk to hold it firmly in place during the subsequent fusing operation.

These and other aspects of the invention will be more fully understood from the following detailed description taken in conjunction with the accompanying drawings in which:

FIG. 1 is a fragmentary end elevation, partly broken away, of the presently preferred embodiment of the invention;

FIG. 2 is a fragmentary plan view, partly broken away, of the apparatus shown in FIG. 1;

FIG. 2A is a view taken on line 2A—2A of FIG. 1;

FIG. 3 is an enlarged view of the jaws taken in the area indicated by line 3—3 of FIG. 2;

FIG. 4 is a right side elevation of the apparatus shown in FIG. 2;

FIG. 4A is an enlarged view taken in the vicinity of line 4A—4A of FIG. 4;

FIG. 5 is a fragmentary end elevation, partly broken away, of the left jaw and associated indexing means for the carriage;

FIG. 5A is a perspective view of the left jaw, slide plates, and indexing means;

FIG. 6 is an exploded perspective view of wire leads, graphite and glass disks, and a metal header;

FIG. 6A is a view taken on line 6A—6A of FIG. 6;

FIG. 7 is a fragmentary perspective view of the disks being moved onto leads in the closed jaws;

FIGS. 8 through 12 are schematic drawings showing the sequence of operations of the apparatus; and FIG. 13 is a schematic drawing of means for holding and releasing articles by vacuum and pressure.

Referring to FIG. 1, the apparatus includes a horizontal table 20 mounted by brackets 22 on top of a horizontal platform 24.

As shown in FIGS. 2 and 4, a plurality of elongated carriages 26 are secured to an endless conveyor or chain 28 looped around the ends of the table and mounted in a conventional manner on forward and rear rotatable sprockets 30, 31, respectively, each mounted on a separate respective transverse horizontal shaft 32 journaled in bearings 33 mounted on the platform.

As shown in FIGS. 1, 2, and 5, each carriage includes a downwardly extending yoke 34 which is secured by a transverse pivot pin 35 to the chain at longitudinally spaced locations. Thus, as the sprockets are turned by conventional means (not shown), the chain and carriage are moved forward over the table and to the rear under the table.

For the purpose of explaining the invention, it is assumed that the sprockets are rotated so the carriages on the top loop of the chain move toward the right in FIG. 4, and all directions such as forward, rear, left, and right are with reference to the direction of carriage travel over the top of the table.

As shown in FIGS. 1, 2, and 5, the carriages on the length of chain above the table pass between left and right parallel upper carriage guides 40, 42, respectively, which are mounted on the table. Each guide is an elongated horizontal and longitudinally extending L-shaped bar, which includes an inwardly opening horizontal groove 44 that extends longitudinally for the length of each guide to receive carriage rollers 46 mounted on the sides of each carriage.

Left and right jaws 50, 52, respectively, are mounted on top of the table on opposite sides of the chain and are adapted to slide horizontally toward and away from each other in a direction perpendicular to chain travel.

As shown best in FIG. 5, the left jaw is secured by a screw 54 to the upper portion of a left horizontal slide plate 56 which is mounted to slide horizontally in a direction perpendicular to the chain between a pair of left horizontal guide strips 58 (see FIG. 2) secured to the top of the table.

As shown best in FIG. 4, the sides of the horizontal slide plate are bevelled to make a dove-tail fit into the upwardly and inwardly inclined sides of the guide plates 58.

A left slide plate yoke 60 is secured by screws 62 to the outer end of the left slide plate and includes a pin 64 across an opening 65 in the yoke.

The pin 64 rests in an upwardly opening fork 66 (see FIGS. 1 and 5) at the upper end of a crank arm 68 which extends down through collinear openings 70 in the table and platform and which is secured intermediate its ends by a longitudinal pivot pin 72 in a block 74 mounted by screws 75 to the underside of the platform. The lower end of the crank arm 68 extends inwardly, and is adapted to ride on a cam (not shown) mounted on a cam shaft (not shown), or be operated by hand. Thus, as the inner end of the crank arm 68 is moved up and down, the upper end moves in and out to move the left horizontal slide plate and left jaw toward and away from the chain. Stop screws 75A are threaded through the ends of the yoke 60, and are held in place by lock nuts 75B to engage the outer ends of guide plates 58 and stop the jaws in the desired position.

A downwardly extending left forward vertical indexing pin 76 (see FIG. 5A) is secured to the forward portion of the inner end of an inwardly extending horizontal bracket 78 formed integrally at its outer end with the upper end of a left vertical slide plate 80 mounted to slide up and down between a pair of left vertical guide strips 82 (see FIG. 5A) secured by screws 84 to the inside face of the upright portion of the left horizontal slide plate. A rear vertical indexing pin 85 is secured to the underside of the inner end of the bracket 78 to the rear of the forward pin 76. The lower end of the vertical locking pins fit into respective indexing holes 86 in the left side of the top of the carriage when the left vertical slide plate 80 is moved down after the jaws are moved together as shown in FIG. 5.

A left rear horizontal and transverse indexing pin 87 includes a head 88 at its outer end countersunk in a stepped bore 89 in the outer face of the left rear vertical guide strip 82. The horizontal pin 87 extends through its respective guide strip, through a horizontal guide hole 90 in the upper left carriage guide, and into an indexing hole 92 in the rear portion of left side of the carriage when the jaws are moved together as shown in FIG. 5. A left front horizontal and transverse indexing pin 93 (FIG. 5A) is mounted in a similar manner in the forward left guide strip 82 and extends into a respective guide hole 94 (FIG. 7) in the forward end of the left side of the carriage.

As shown best in FIGS. 2, 3, and 5, the inside edge of the left jaw 50 includes a series of vertical notches 96, and right jaw 52 includes a series of teeth 98 arranged so that each jaw tooth 98 fits into a respective jaw notch 96 when the jaws are moved together. The root of each notch includes a vertical semicircular groove 100 which extends for the entire thickness of the jaw, and the crest of each tooth includes a vertical semicircular groove 101 which extends for the same distance so that when the two jaws are brought together the two semicircular grooves form a circular guideway 102 which is adapted to hold a wire 103 or other suitable elongated member in a vertical position.

As shown best in FIG. 3, the inner faces of the jaws also include vertical semicircular grooves 104 where the notches and teeth begin so that when the jaws are brought together three vertical guideways are formed so that three wires can be held in the vertical position shown in FIG. 5.

Referring to FIG. 5, a graphite boat 106, or other suitable receptacle, is disposed in a longitudinally extending notch 108 in the upper surface of each carriage 26. The bottom of each notch includes upwardly extending lugs 109 which fit into matching holes 110 in the bottom of the boat so the boat is held in a fixed position with respect to the carriage.

For the purpose of explaining the invention, it is assumed that the articles handled by the machine are those required in the manufacture of transistors, and to this end transistor headers 112, which may be of conventional type, are mounted in separate respective bores 114 in the top of the graphite boat. Each header includes a laterally extending ear 116 (see FIGS. 6 and 7) which fits in a laterally extending notch 118 in the top surface of the boat so that the header is oriented with holes 119 in its bottom aligned with holes 120 in the bottom of the bore 114 in the boat.

As shown best in FIG. 6, a transistor of the type used in explaining the machine includes four electrical leads, three of them being relatively long leads 103, and a fourth lead 122 being relatively short so that it does not extend up above the top of the header.

Referring to FIGS. 1 and 2, an elongated and longitudinally extending left transfer plate 130 is secured at its opposite ends by transverse links 132 and a shaft 134 along one edge to the forward and rear ends of an elongated and longitudinally extending block 136 mounted on the top of the left jaw.

The link 132 at the rear end of the transfer plate includes a rearwardly extending traveling pin 138 disposed in a longitudinal slot 140 in the upper end of a bell crank arm 142 secured by a pivot pin 143 to a Z-shaped block 144 mounted on the rear face of the left jaw 50.

The lower end of the bell crank arm 142 includes a roller 144 which rides on the upper surface of a vertical push rod 146 which extends down through the table and plate so that it may be driven in a conventional fashion by a cam shaft, or operated by hand. A vertical tension spring 148 is secured at its upper end to the lower portion of the bell crank arm 142 and at its lower end to the table so that the spring urges the crank arm roller 144 down into constant contact with the upper end of push rod 146.

The upper portion of push rod 146 is externally threaded and carries a pair of lock nuts 150, which are adapted to engage the inner end of a transverse horizontal foot 152 formed integrally at the rear end of a longitudinal treadle 153 (see FIG. 2A) secured at its outer edge and opposite ends by pivot pins 154 to brackets 155 on the table. As the push rod 146 and locking nuts 150 move down to the position shown in FIG. 1, the foot 152 is pulled down, and also pulls down a vertical release arm 156 secured at its lower end by a pivot pin 157 to the treadle 153, and secured at its upper end by a pivot pin 158 (see FIG. 1) to an intermediate portion of a longitudinal rocker arm 159 secured by a pivot pin 160 to a downwardly extending bracket 162 mounted on the bottom of a downwardly and inwardly inclined ramp 164 supported by a longitudinal cross number 165 (FIG. 4) attached at its forward and rear ends to upright posts 166 mounted on the top of the table.

A compression spring 168 is mounted in an upwardly opening recess 169 in the outer edge of the rocker arm 159 to urge the inward portion of the rocker arm upwardly.

A plurality of longitudinally spaced and upwardly and inwardly extending stop pins 170 are mounted on the inner edge of the elongated rocker arm 159, and each extend up through a respective opening 172 in the bottom of the inner edge of the ramp 164.

A transparent cover 174 is mounted on the top of the ramp and includes a series of downwardly opening grooves 176 (see FIG. 4A) which extend from the outer edge of the ramp and curve gently to the rear to each terminate adjacent the outer edge of the left transfer plate when it is in the solid line position shown in FIGS. 1 and 2.

As shown best in FIGS. 4 and 4A, each groove 176 in the bottom of the cover 174 fits over a separate respective ridge 178 in the upper surface of the ramp 164 to form a track down which articles such as glass disks 179 or graphite disk 180 can slide to the outer edge of the transfer plate.

Referring to FIGS. 6 and 6A the glass and graphite disks 179, 180 include grooves 182 in their surfaces to fit over the ridges 178 on the top surface of the ramp. Thus, when the disks slide down the ramp they are held so that openings 183 through them are in a fixed position with respect to the apparatus.

As shown in FIG. 2, the outside edge of the left transfer plate 130 has notches 184 arranged in a sawtooth fashion to match notches 185 along the inside edge of the ramp and cover.

Referring to FIGS. 2 and 7, a series of outwardly and forwardly opening recesses 186 are formed along the notched edge and top (as shown in the solid line position of FIG. 1) surface of the left transfer plate. Each recess 186 includes a ridge 187 in its upper surface which matches the ridge 178 on a corresponding track on the inside edge of the left ramp. Thus, as an article such as a glass disk slides down a track in the ramp, it comes to a stop in a respective recess in the notched edge left plate. A vertical bore 190 (see FIGS. 7 and 13) in the left plate extends down from the bottom of each recess and is connected at its lower end to the outer end of a separate respective lateral bore 192 which in turn is connected at its inner end to a longitudinal bore 194. A downwardly extending bore 196 is connected at its upper end to the longitudinal bore 194 and terminates at its lower end in a tube 197 to which is connected one end of a line 198. The other end of the line 198 is connected to a two way valve 200 (FIG. 13), which can be turned to a pressure line 201 or to a vacuum line 202. Pressure and vacuum are supplied to line 201 and 202 by conventional sources (not shown). The valve 200 is operated either manually or by a conventional cam mechanism (not shown) synchronized with the other cam actuated mechanisms for the previously described elements.

Referring to FIG. 1, the right side of the apparatus includes a right transfer plate 130 and a right ramp 164 which are identical with the left transfer plate and left ramp just described, and therefore are given the same reference numerals. The right transfer plate and right ramp are supported and actuated by elements identical with those associated with the left transfer plate and left ramp, and therefore are not described in detail for the sake of brevity. However, these associated elements are given the same reference numerals as those used for the elements on the left side of the apparatus. In other words, the apparatus is symmetrical about a longitudinal vertical plane passing through the center of the carriages, except for the notches and teeth formed in the adjacent edges of the jaws as previously described.

The operation of the apparatus is understood most readily by referring to the schematic drawings presented in FIGS. 8–12. Referring to FIG. 8, the jaws are moved outwardly, i.e., open, so that previously assembled headers and wires can be moved forward. A subsequent carriage 26 moves into loading position under the jaws with empty headers in each recess in the boat in the carriage. As shown in FIG. 8, the short lead 183 has already been placed in position, either manually or by automatic apparatus (not shown).

When the jaws open as shown in FIG. 8, both the right and left transfer plates are raised to intermediate position to provide clearance past the inner edges of the right and left ramps.

When the carriage is in proper position, the jaws are moved together as shown in FIG. 9, and the transfer plates are moved outwardly and downwardly by lowering the push rods 146 (FIG. 1) so that their outer edges are brought into alignment with the inner edges of the right and left ramps.

The locking nuts 150 on the rods 146 pull down the feet 152 so the stop pins 170 move down to release the disks which are stored in the tracks of the ramps. A separate disk slides into a respective recess on the outer edge of each of the transfer plates. The valve 200 (FIG. 13) is turned to connect the vacuum source to the holes under the disks on the transfer plates. Even though some air may leak through and around the disks, the vacuum source is of sufficient capacity to hold the disks in place even when the plates are inverted.

The jaws are moved inwardly, and the horizontal locking pins on each side of the carriage enter the horizontal bores in the side of the carriage to index the carriage longitudinally with respect to the jaws as shown in FIG. 5. The jaws are now closed as shown in FIG. 7 so each guideway is collinearly disposed above a respective hole in the header and boat. Then the vertical slide plates 80 are moved down so the vertical indexing pins enter the vertical bores 86 in the top surface of the carriage to index carriage in a fixed position with respect to the guideways formed by the closed jaws. Thereafter, the long electrical leads 103 are slipped down through the guideways, either manually or by automatic machinery, so that they pass through the holes in the bottom of the header and in the boat. The leads are of such length that their upper ends lie in the horizontal plane passing through the plate pivot shafts 134.

Assuming that graphite disks come down the right ramp, and that glass disks come down the left ramp, the left transfer plate is pivoted about its shaft 134 in a clockwise direction as viewed in FIG. 11 until each glass disk in each respective recess is disposed so that three openings in the disk move down over the upper ends of the three respective long leads 103. As shown best in FIG. 5, the upper ends of the long wires lie in the same horizontal plane as the longitudinal axis of the transfer plate shafts 134 so that there is a minimum of lateral in or out movement of the glass disks as they make the final approach onto the upper ends of the wires 103. When the glass disks are in the proper position, the valve 200 (FIG. 13) is turned from the vacuum source to the pressure source so that a separate glass disk is discharged to slide down each set of wires and come to rest on the upper surface of the closed jaws.

Thereafter, the left transfer plate is returned to the intermediate position shown in FIG. 12, and the right transfer plate is operated just as the left transfer plate to deposit a graphite disk on the upper surface of the glass disk. Thereafter, the right transfer plate is returned to the intermediate position shown in FIG. 8, and the jaws are opened to permit the electric carriage and leads to be moved out from between the jaws and make room for the succeeding carriage.

It should be noted that when the transfer plates are moved away from their respective ramps, the stop pins 170 are automatically moved up by the springs 168 (FIG. 1) to prevent the discharge of disks when the plates are not in position to receive them. The graphite and glass disks may be placed manually in the tracks on the ramps, but preferably they are fed into the tracks automatically from conventional vibrators sold under the trade name "Syntron."

For purposes of illustrating the invention, each carriage is shown as carrying a boat with ten headers. Thus, 20 disks are placed on the wires each time the carriage passes between the jaws. Of course, the number of headers carried by the carriage can be increased or decreased to accommodate the particular operation involved. In any event, it will be appreciated that the machine automatically and accurately does a job which previously required several operators of considerable manual skill and patience.

I claim:

1. Article handling apparatus comprising a carriage on which articles are to be mounted, means for moving the carriage past a loading station, a pair of movable jaws mounted adjacent and on opposite sides of the carriage, means for moving the jaws laterally with respect to the direction of carriage travel past the loading station between open and closed positions, adjacent portions of the jaws being toothed and meshing to overlie the carriage when the jaws are closed, and means on the adjacent portions defining a plurality of laterally offset elongated guideways extending toward the carriage when the jaws are closed.

2. Article handling apparatus comprising a carriage on which articles are to be mounted, means for moving the carriage past a loading station, a pair of movable jaws mounted adjacent and on opposite sides of the carriage, means for moving the jaws laterally with respect to the direction of carriage travel past the loading station between open and closed positions, adjacent portions of the jaws being toothed and meshing to overlie the carriage when the jaws are closed, and means on the said meshing portion on at least one of the jaws defining a plurality of laterally offset recessed elongated guideways arcuate in transverse cross section and extending toward the carriage when the jaws are closed.

3. Article handling apparatus comprising a carriage on which articles are to be mounted, means for moving the carriage past loading station, a pair of movable jaws mounted adjacent and on opposite sides of the carriage, first and second locking means on at least one of the jaws, third and fourth locking means on the carriage to receive the first and second locking means, respectively, means for moving the jaws and first and second locking means laterally with respect to the direction of carriage travel past the loading station between open and closed positions, the first and third locking means engaging and adjacent portions of the jaws being toothed and meshing to overlie the carriage when the jaws close, means for moving the second locking means in a direction transverse to that in which the jaws move to engage the second locking means with the fourth, and means on the adjacent portions defining a plurality of laterally offset elongated guideways extending toward the carriage when the jaws are closed.

4. Article handling apparatus comprising a carriage on which articles are to be mounted, means for moving the carriage past a loading station, a pair of movable jaws mounted adjacent and on opposite sides of the carriage, means for moving the jaws laterally with respect to the direction of carriage travel past the loading station between open and closed positions, adjacent portions of the jaws being toothed and meshing to overlie the carriage when the jaws are closed, means on the adjacent portions defining a plurality of laterally offset elongated guideways extending toward the carriage when the jaws are closed, a transfer plate mounted adjacent the jaws to pivot between an upright position spaced from the guideways and an inverted position nearer the guideways, the plate having a plurality of longitudinally spaced recesses which open upwardly to receive articles when the plate is upright and open downwardly to discharge articles when the plate is inverted, and vacuum means connected to the recesses for holding and releasing the articles.

References Cited in the file of this patent

UNITED STATES PATENTS

| | | |
|---|---|---|
| 821,946 | Marshall | May 29, 1906 |
| 2,644,998 | Klinkert et al. | July 14, 1953 |
| 2,769,228 | Burge et al. | Nov. 6, 1956 |
| 2,831,238 | Chase et al. | Apr. 22, 1958 |
| 2,842,832 | Chase et al. | July 15, 1958 |
| 2,858,006 | Kalbow | Oct. 28, 1958 |
| 2,925,183 | Eastus | Feb. 16, 1960 |

UNITED STATES PATENT OFFICE

CERTIFICATE OF CORRECTION

Patent No. 3,084,811                                                        April 9, 1963

Richard R. Bower

It is hereby certified that error appears in the above numbered patent requiring correction and that the said Letters Patent should read as corrected below.

Column 3, line 65, before "vertical" insert -- left --.

Signed and sealed this 12th day of November 1963.

(SEAL)
Attest:

ERNEST W. SWIDER                                       EDWIN L. REYNOLDS

Attesting Officer                                         Acting Commissioner of Patents